UNITED STATES PATENT OFFICE.

VICTOR HONORÉ EUGÈNE GALLET, OF PARIS, FRANCE.

IMPROVEMENT IN THE MANUFACTURE OF STEEL.

Specification forming part of Letters Patent No. 146,330, dated January 13, 1874; application filed December 29, 1873.

*To all whom it may concern:*

Be it known that I, VICTOR HONORÉ EUGÈNE GALLET, of Paris, France, have invented certain new and useful Improvements in the Manufacture of Cast-Steel and Steel of Cementation, and in the Transformation of Iron Ores Directly into Cast-Steel, of which the following is a specification:

By my invention I am enable to obtain with certainty cast-steel and steel of cementation of the first quality from ordinary wrought-iron, iron puddled with coke or wood, puddled steel, bessemer steel, scraps of steel springs, and, in general, all steel obtained directly, either from ore or from cast-iron.

In my process I vary both the substances and the proportions of the substances composing the cement, according to the quality of the ore or the steel to be treated, for it is not possible to obtain the same effect by a like treatment of bodies of different composition, such as iron ore and steel. I therefore employ different proportions and new combinations of aluminous substances, which combine chemically with the aluminous oxides of potash. Potash calcined and reduced in the presence of steel and carbon determines the formation of potassium and calcium, which absorb and carry off the sulphur, phosphorus and other metalloids contained in the iron ores or steel treated.

In order to obtain cast-steel of the first quality from the wrought-irons above named, I employ usually a cement, the composition of which, taking the gram as the unit of weight, is as follows: Alumina, one-half to one gram; highly aluminous clay, twelve to twenty grams; pulverized wood-charcoal, soot, and lamp-black, fifty grams; carbonate of lime, thirty-eight to forty-two grams; carbonate of potash, eighteen to thirty grams; carbonate of soda, two grams; caustic potash, one-half to one gram; oxide of manganese, four grams; rosin, four to five grams; common salt, one gram; sal-ammoniac, one-half to one gram; borax, one-half to one gram; water, about ten per cent. of weight.

The aluminum and alumina can be replaced by highly aluminous clay, taken in such proportions that the quantity of alumina contained in the clay shall be equal to the alumina which would otherwise be employed. This proportion varies from eight to twenty parts. It is better that the clay should be of a pure aluminous kind, in order that it may be entirely absorbed or taken up in the operation. Very pure and very aluminous yellow clay should have the preference. The soot and lamp-black can be replaced by an equivalent quantity of wood-charcoal. The borax, caustic potash, carbonate of soda, and sal-ammoniac may be dispensed with. The mixing of all these substances should be carefully effected.

The number of substances employed and their proportions can be varied, according to the nature of the product to be obtained, and according to the nature of the substances to be employed. For example: To eighteen kilograms of wrought-iron, made by puddling with coke, I take charcoal, four hundred grams, consisting of fifty grams of lamp-black and three hundred and fifty grams of pulverized wood-charcoal; pulverized carbonate of lime, three hundred and twenty grams; highly aluminous clay, ninety-six grams; oxide of manganese, thirty-two grams; rosin, thirty-two grams; carbonate of potash, thirty-two grams; marine salt, eight grams; alumina, four grams; caustic potash, four grams; borax, four grams; sal-ammoniac, four grams; carbonate of soda, sixteen grams. These substances are mixed with about ten per cent. in weight of water, and the carbonate of soda, carbonate of potash, and marine salt are first dissolved. After the mixing is completed, there should invariably be added from one hundred and eighty to two hundred grams of carbonate of potash dissolved in a quantity of water sufficient to bring the whole mixture to the condition of mud of liquid consistency.

The iron to be treated is cut up or divided into pieces of from two hundred to three hundred grams in weight. It is then coated and covered as completely as possible with the cement, and the whole is then placed in crucibles. Three and one-half hours after, there will be obtained fine steel, fit to be used for making tools.

By modifying the dose of the composition formed of the bodies indicated in the first operation, there can be obtained, at will, a harder or softer steel. The dose which I have above given is in the proportion of fifty grams to the kilogram of wrought-iron. By treating bessemer or krupp scrap with a dose varying from fifteen to twenty-five grams to the kilogram, according to the quality to be obtained, a very complete purification is effected, so that the cast-steel thus obtained will compare not unfavorably with the best brands or qualities in the market. In like manner all cast-steel, obtained either directly from the ore or from cast-iron by puddling, can be treated with great success in the same way as just stated with reference to the bessemer or krupp steel.

To produce steel of cementation, I treat with my cement, preferably, the wrought-iron produced from gray pig, containing the least possible quantity of carbon, and termed puddled iron.

For the production of cast-steel directly from the ore, I take the same composition of cement, which is mixed with the ore.

The process can be carried on in any of the ordinary furnaces in use which will afford a heat sufficient for the casting of steel.

Wrought-iron produced by puddling with coal—mineral coal—requires a greater quantity of the cement, varying from four to eight per cent., according to the quality of steel desired. Wrought-iron produced by puddling with wood requires from three to six per cent. of the cement. Bessemer steel, scraps or clippings of springs, and puddled steel require from one and one-half to four per cent. of cement. These steels demand an increased proportion of carbonate of potash, varying from twenty-two to thirty parts, in the composition of the cement.

Having described my invention, what I claim, and desire to secure by Letters Patent, is—

A cement made of the substances taken in the proportions substantially as herein specified, for the manufacture of cast-steel and steel of cementation, as set forth.

In testimony whereof I have signed my name to this specification before two subscribing witnesses.

V. H. E. GALLET.

Witnesses:
EMILE BARRAULT.
AUG. VINCK.